UNITED STATES PATENT OFFICE.

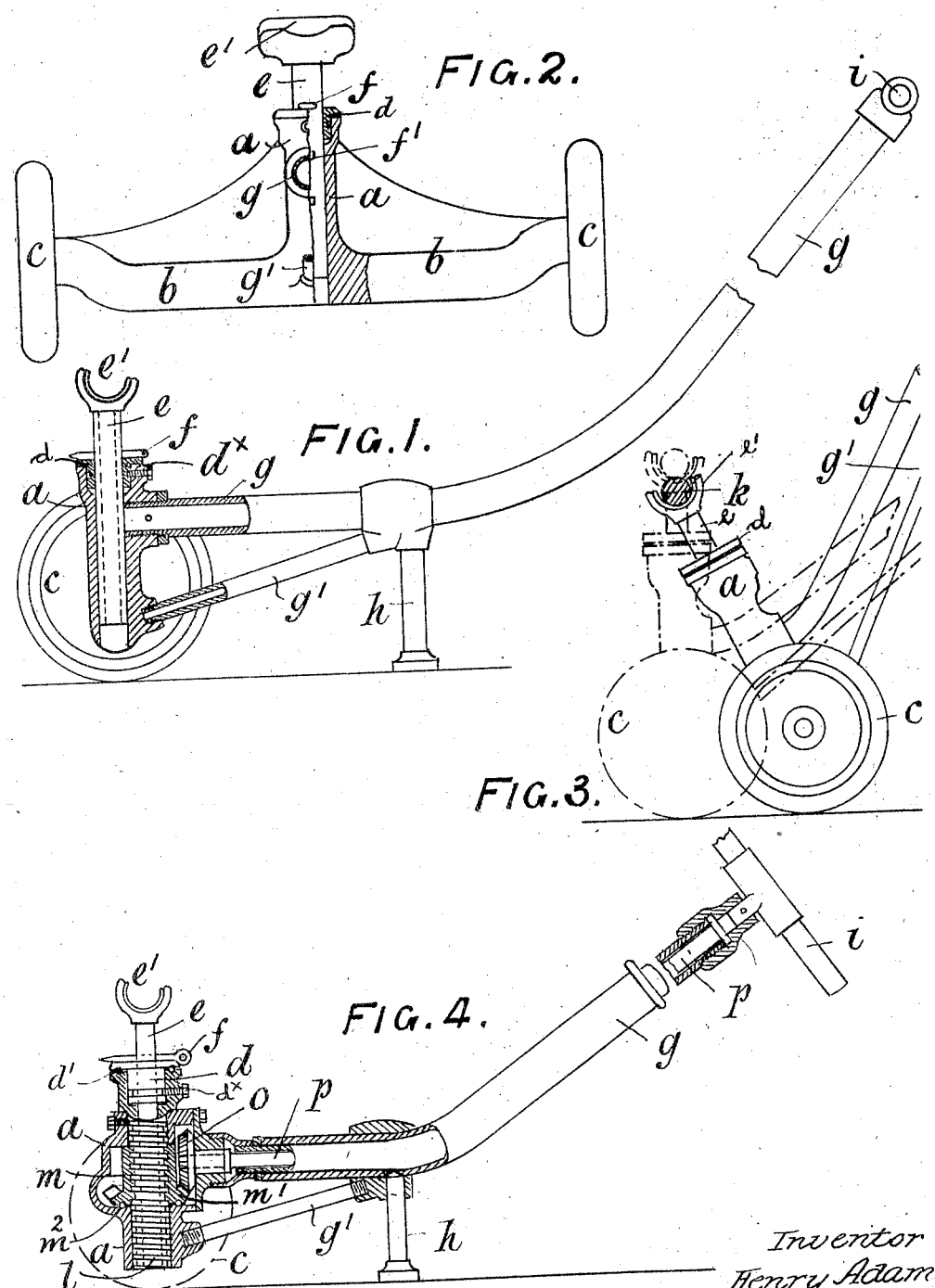

HENRY ADAMS, OF TUNBRIDGE WELLS, ENGLAND.

JACK FOR LIFTING AND TRANSPORTING MOTOR-CARS, &c.

No. 811,116.　　　　Specification of Letters Patent.　　　　Patented Jan. 30, 1906.

Application filed March 11, 1905. Serial No. 249,607.

*To all whom it may concern:*

Be it known that I, HENRY ADAMS, a subject of the King of Great Britain, residing at 30 Monson Colonnade, Tunbridge Wells, in the county of Kent, England, have invented an Improved Jack for Lifting and Transporting Motor-Cars and other Vehicles, of which the following is a specification.

My invention has for its object to provide a jack which shall be simple and convenient for use for lifting a motor-car or other vehicle and when so raised to enable said car or vehicle to be readily transported or maneuvered in a small space.

According to my invention I construct the jack essentially of a column or strut mounted upon wheels and provided with a claw, axle-rest, or its equivalent, and a suitable shaft or handle-lever or other operating device, so that when said column or strut is tilted out of its normal vertical position, so as to engage the claw under the axle of the vehicle, said column may be again raised to its vertical position (by means of the shaft or other operating device) thereby raising the vehicle upon said jack, which being on wheels enables the same, with the vehicle, to be maneuvered about as desired.

In the accompanying drawings I have shown three forms of my invention.

Figure 1 is a sectional side elevation, and Fig. 2 is a sectional end elevation, of one example; and Fig. 3 is a side elevation of a modified form of this example illustrating its use. Fig. 4 is a sectional side elevation of another example.

Referring now to Figs. 1, 2, and 3, which represent simple forms of my invention, $a$ is a tubular column which is integral with carrier-frame $b$, a wheel $c$ (preferably resiliently tired) being mounted at each end, as shown. The column $a$ is provided with a rotatable socket or collar $d$, held therein by the screw $d^\times$, and a stem $e$, provided with a claw or rest $e'$, is arranged to telescope into said socket $d$ and column $a$. The height of said claw-stem $e$ may be regulated by means of a pin $f$, which is passed through either of the holes $f''$ in the stem. $g$ is a shaft or handle-lever which is fixed to the column $a$ and strengthened by the stay $g'$. $h$, Fig. 1, is a strut, which is fixed in a lug on the shaft $g$ to serve as a support for said shaft. $i$ is a T-handle which is fixed to the end of the shaft $g$. The action of this simple form of my invention is clearly indicated in Fig. 3, the full lines showing the jack tilted, with its claw $e'$ engaging the under side of the axle $k$ of a car or vehicle and the dotted lines indicating the position of the jack and axle raised and ready for transporting or maneuvering.

In the case of heavy motor-cars or vehicles I provide the column $a$, Fig. 4, with a screw-threaded pillar $l$, the upper end of which carries the socket $d$, mounted on the ball-bearings $d'$ and claw-stem $e$, rotatably held therein. Surrounding and engaging with said screw-threaded pillar $l$ is a nut $m$, which is fixed to or integral with a bevel-wheel $m'$, the nut $m$ being preferably carried upon ball-bearings $m^2$. The bevel-wheel and nut $m$ are rotated by a bevel-pinion $o$, mounted in bearings in the carrier-frame and fixed upon the lower end of a flexible shaft $p$, which is free to be rotated within the tubular shaft or lever $g$, the shaft $p$ being rotated by means of the T-handle $i$. This form of jack may also be provided with a strut $h$ and stay-bar $g'$, and the screw-threaded pillar $l$ may be prevented from rotating by suitable means. This form of jack, Fig. 4, may be used in a similar manner to that shown in Fig. 3, or it may be located under the axle and the pillar, claw-stem, and axle raised by means of the bevel-gear and nut.

When in use, the wheels $c$ become for the time being the front wheels of the car or vehicle, and the stem $e$ being rotatable within the column $a$ enables the car or vehicle to be more readily maneuvered in a small space than would be possible in the usual way.

I claim—

1. A jack for lifting and transporting motor-cars, carriages and the like, comprising a column, a carrier-frame supporting said column and mounted upon wheels, an axle-rest rotatably carried by said column, and means enabling said column to be tilted and also restored to its normal vertical position, as set forth.

2. A jack for the purposes aforesaid, comprising a tubular column, a carrier-frame supporting said column, wheels on said frame, a rotatable socket in said column, an axle-rest carried in said socket, and a lever-handle enabling said column to be tilted and restored to its normal vertical position, as set forth.

3. A jack for the purposes aforesaid, comprising a tubular column, a carrier-frame supporting said column, wheels on said frame, a rotatable socket mounted upon ball-bearings in said column, an axle-rest carried in said socket, a height-adjustment device for said column, a lever-handle, and a strut supporting said jack in its normal position, as set forth.

4. A jack for the purposes aforesaid, comprising a tubular column, a carrier-frame supporting said column and mounted on wheels, a tubular pillar adapted to slide in said column, a rotatable socket in said pillar, an axle-rest carried in said socket, a height-adjustment device for said rest, a nut engaging a screw-thread on said pillar, means rotating said nut when operated, a lever-handle, and a strut, as set forth.

5. A jack for the purposes aforesaid, comprising a tubular column, a carrier-frame supporting said column and mounted on wheels, a tubular pillar, a rotatable socket in said pillar, an axle-rest carried in said socket, a height-adjustment device for said rest, a nut engaging a screw-thread on said pillar, ball-bearings for said nut, a bevel-wheel fixed to said nut, a bevel-pinion mounted in bearings in said carrier-frame, a tubular lever-handle fixed to said frame, a flexible shaft carried in said tubular lever-handle and fixed at one end to said bevel-pinion and at the other end to a suitable rotative means, and a strut, as set forth.

Dated this 21st day of February, 1905.

HENRY ADAMS.

Witnesses:
GEORGE C. DOWNING,
WALTER J. SKERTEN.